United States Patent [19]

Asano et al.

[11] Patent Number: 5,202,705

[45] Date of Patent: Apr. 13, 1993

[54] ELECTROSTATIC LATENT IMAGE FORMING DEVICE HAVING A CERAMIC INSULATING LAYER

[75] Inventors: Kazuo Asano; Koji Masuda; Yuji Suemitsu, all of Kanagawa, Japan

[73] Assignee: Fuji Xerox Co., Ltd., Tokyo, Japan

[21] Appl. No.: 593,926

[22] Filed: Oct. 5, 1990

[51] Int. Cl.⁵ .................................. G01D 15/06
[52] U.S. Cl. .................................... 346/159
[58] Field of Search ............ 346/155, 159, 139 R, 346/110 R, 110 V

[56] References Cited

U.S. PATENT DOCUMENTS

| | | | |
|---|---|---|---|
| 4,155,093 | 5/1979 | Fotland et al. | 346/159 |
| 4,658,275 | 4/1987 | Fujii et al. | 346/155 X |
| 4,956,670 | 9/1990 | Masuda et al. | 346/159 X |
| 4,985,716 | 1/1991 | Hosaka et al. | 346/159 |

*Primary Examiner*—George H. Miller, Jr.
*Assistant Examiner*—Randy W. Gibson
*Attorney, Agent, or Firm*—Finnegan, Henderson, Farabow, Garrett and Dunner

[57] ABSTRACT

An electrostatic latent image forming device has at least two electrodes with an insulating layer formed between the two electrodes. The electrodes are arranged in a matrix array. One set of electrodes has space regions formed in the electrodes in which creeping corona discharge occurs when a voltage is applied to those electrodes. The insulating layer between the electrodes is formed of a ceramic material. A third electrode is used to draw the ions out of the apertures of the electrodes. A ceramic insulating layer is placed between the electrodes with the apertures and the third electrode.

14 Claims, 2 Drawing Sheets

ELECTROSTATIC LATENT IMAGE FORMING DEVICE HAVING A CERAMIC INSULATING LAYER

BACKGROUND OF THE INVENTION

1. Field of the Invention

This invention relates to a device for forming an electrostatic latent image used in electrostatic recording. The invention particularly relates to an electrostatic latent image forming device adopting ion current control.

2. Description of the Prior Art

A conventional electrostatic latent image forming device adopting ion current control is shown in FIG. 5. Driving electrodes 51 are disposed parallel to each other on an insulating substrate 50, while control electrodes 54 intersect the driving electrodes 51 through an insulating layer 52. A matrix is formed by the driving electrodes 51 and the control electrodes 54. Two thin electrodes 55 formed parallel to each other are connected to each control electrode 54. A space 56 for generating ions exists between the electrodes 55. A plate-like screen electrode 58 is disposed on the control electrodes 54 through an insulating layer 57, and the screen electrode 58 is, as shown in FIG. 6, provided with circular openings 59 for deriving ions only at positions corresponding to the space regions 56. An opening 60 is located in the insulating layer 57.

The electrostatic latent image forming device applies a high-frequency high voltage between the driving electrodes 51 and the screen electrode 58. The image forming device applies ion control voltage to the control electrodes 54, and applies d.c. voltage to the screen electrode 58. Creeping corona discharge occurs between the driving electrode 51 and the control electrode 54 in the space 56. Ions generated by creeping corona discharge are accelerated or absorbed in an electric field generated by the control electrode 54 and the screen electrode 58 to control ion emission and form an electrostatic latent image.

Thinly separated natural mica is used for the insulating layer 52. A thin plate made of copper, stainless steel or another conductive electrode material is laminated onto the surface of the natural mica, and each conductive thin plate is then photoetched to form the driving electrodes 51 and the control electrodes 54.

The prior art electrostatic latent image forming device is limited by the use of natural mica. Only homogeneous natural mica of the best quality with a designated size and thickness can be used. The availability of high quality, natural mica is limited, and mass production is difficult. If there is a flaw or a defect in the insulating layer, either creeping corona discharge will not occur, or dielectric breakdown will occur. In either event, stable discharge characteristics are not obtained. Further, if natural mica is used as an insulating layer, skilled craftsmanship for separating natural mica to a fixed thickness and for cutting natural mica to a designated size is required. Therefore, mass production is difficult.

A pressure sensitive adhesive may be used to laminate electrode material onto the surface of the natural mica. However, the pressure sensitive adhesive lacks heat resistance and discharge resistance, and, therefore, a manufactured electrostatic latent image forming device is unstable and unreliable.

SUMMARY OF THE INVENTION

An object of the present invention is to provide an electrostatic latent image forming device using material with high voltage and discharge resistance as an insulating material.

Another object of the present invention is an electrostatic latent image forming device that can be mass produced.

A further object of the present invention is a highly reliable electrostatic latent image forming device which has strength to withstand the impact of ions, stability to resist chemical reaction by active materials generated by discharge or plasma, and resistance to temperature increases.

Still a further object of the present invention is an electrostatic latent image forming device with uniform discharge to produce uniform electrostatic latent images.

Yet another object of the present invention is an electrostatic latent image forming device with decreased generation of ozone and discharge products.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects of the invention, an ion producing device for an electrostatic latent image former is provided comprising a plurality of first electrodes; a plurality of second electrodes, each of the second electrodes having an aperture; an electrically insulating layer arranged between the first and second electrodes and in contact with the first and second electrodes, the insulating layer being formed of a ceramic material; and a voltage source for applying a voltage to at least one of the second electrodes. Ions are generated in the apertures of the at least one of the second electrodes.

BRIEF DESCRIPTION OF THE DRAWINGS

The accompanying drawings, which are incorporated in and constitute a part of this specification illustrate embodiments of the invention and, together with the description, serve to explain the principles of the invention. In the drawings.

DETAILED DESCRIPTION OF THE INVENTION

Figure 1:
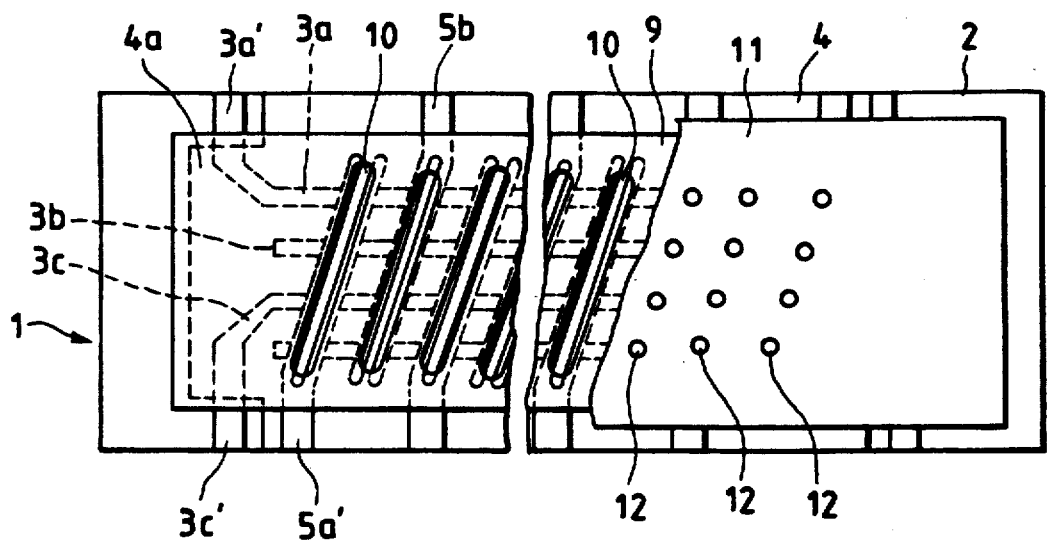
FIG. 1 is a plan view, with portions broken away, showing one embodiment of an electrostatic latent image forming device according to the present invention.

An electrostatic latent image forming device has a plurality of first electrodes, a plurality of second electrodes and an electrically insulating layer. The first and second electrodes are arranged in a matrix, with the insulating layer sandwiched between first and second electrodes. The second electrodes have an aperture or a space region for causing creeping corona discharge by applying a voltage between the first electrodes and the second electrodes. The insulating layer is formed of ceramic material.

In a second embodiment of the invention, an electrostatic latent image forming device has a plurality of first electrodes, a plurality of second electrodes, a third electrode, a first insulating layer and a second insulating layer. The first and second electrodes are arranged in a matrix, with the first insulating layer sandwiched between the first and second electrodes. The second electrodes have a space region for causing creeping corona discharge by applying a voltage between the first and second electrodes. The third electrode is disposed, with the second insulating layer interposed, in a space with the second electrodes. The third electrode includes an ion derivation region for deriving ions generated by the creeping corona discharge. The first and second insulating layers are formed of ceramic material.

The electrodes and insulating layers are integrally manufactured by sintering.

An electrode is formed into a green sheet state before firing when ceramic materials such as alumina, zirconia are used. The green sheet material is obtained by adding a firing assistant (SiO$_2$ MgO, CaO or the like) to alumina (Al$_2$O$_3$) powder, an organic binder, a plasticizer, and a dispersant required for molding.

Materials formed by sintered metallic conductors such as tungsten (W), molybdenum (Mo), tungsten manganese (W.Mn), molybdenum manganese (Mo.Mn) are used as the first and second electrodes.

The electrostatic latent image forming device according to the present invention is manufactured by printing laminating or sheet laminating. In printing laminating, the first electrode is formed on a comparatively thick green sheet as a substrate by screen process printing, and an insulating layer is laminated on the substrate where the first electrode is formed by screen process printing. Then, the second electrode is formed on the insulating layer by screen process printing. In sheet laminating, an electrode is formed on a comparatively thin green sheet as a substrate by screen process printing, and the green sheet is dried. Then, a plurality of the green sheets are laminated and pressed to form multilayer sheets.

Both printing laminating and sheet laminating are methods of finally obtaining an electrostatic latent image forming device by firing a substrate at high temperature in reduction environment. The reduction environment is such that gas contained in a firing furnace comprises Nitrogen gas replaced for air of the firing furnace and a little amount of hydrogen gas. As the laminated green sheets are fired, an electrode formed on the sheet contracts by 12 to 20-odd percent. The dimensions before firing must be set to attain the dimensions desired after firing by relying on a coefficient of contraction.

The insulating layer formed of ceramic material has high voltage and discharge resistance. The ceramic insulating layer can be mass produced by a molding process, or a firing process. With the ceramic insulating layer, a highly-reliable electrostatic latent image forming device able to withstand the impact of ions, resist chemical reaction by active material generated by discharge or plasma, and resist heat is obtained. The ceramic insulating layer can be manufactured according to designated form and characteristics to provide uniform discharge.

Even if the ceramic insulating layer is thin, 10–50 μm thick, satisfactory dielectric voltage resistance can be obtained. Accordingly, stable discharge can be obtained with low voltage, reducing ozone and discharge product.

Both the insulating layers and the electrodes are fired at a high temperature and manufactured as an integral sintered body. Therefore, the insulating layer is solid, and the electrode has strength, stability, and heat resistance. The binding of the insulating layer and the electrode is also very firm.

The present invention will now be described by way of one illustrated embodiment.

FIGS. 1 to 4 show one embodiment of an electrostatic latent image forming device according to the present invention. A recording head 1 includes a plane rectangular insulating substrate 2 comprising a ceramic substrate such as alumina. A plurality of driving electrodes 3a, 3b, 3c ... are arranged parallel to each other along the longitudinal direction on the surface of the insulating substrate 2. The end portions of the driving electrodes 3a, 3b, 3c ... are bent to both end sides in the cross direction of the insulating substrate 2. The driving electrodes 3a, 3b, 3c ... are formed by pattern-printing a metal such as tungsten on the insulating substrate 2 by screen printing. The thickness of the driving electrodes 3a, 3b, 3c ... is 5–40 μm. Terminal portions 3a', 3b', 3c' are respectively provided on the end portions of the driving electrodes 3a, 3b, 3c ...

Figure 4:
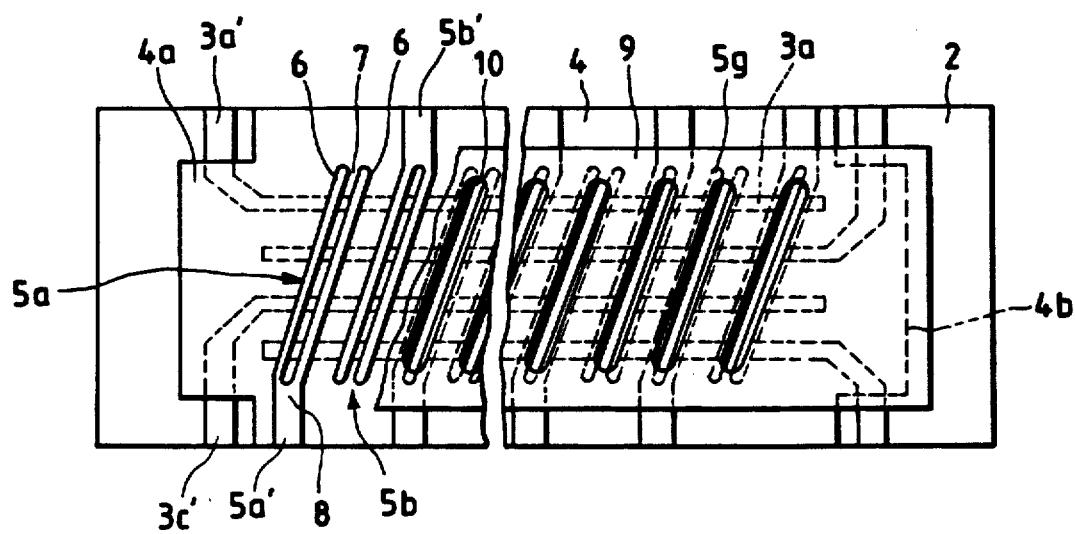
FIG. 4 is a plan cutaway view of FIG. 3.
Figure 5:
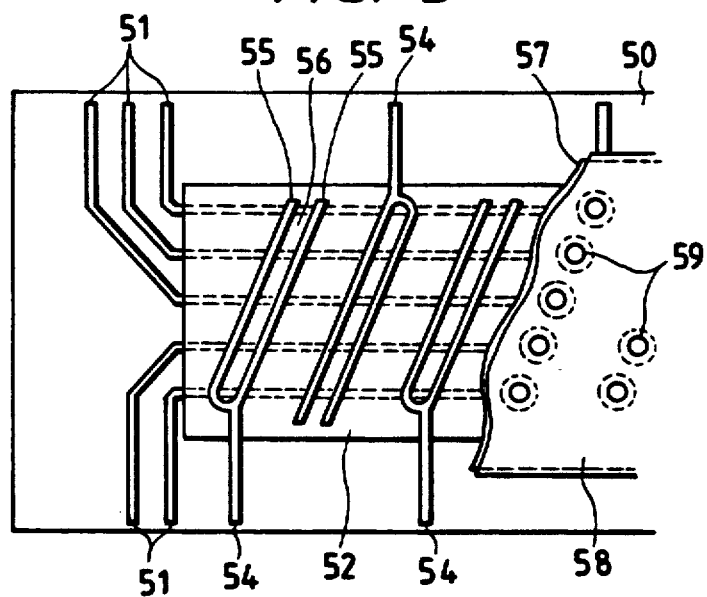
FIG. 5 is a plan cutaway view of the conventional device.
Figure 6:
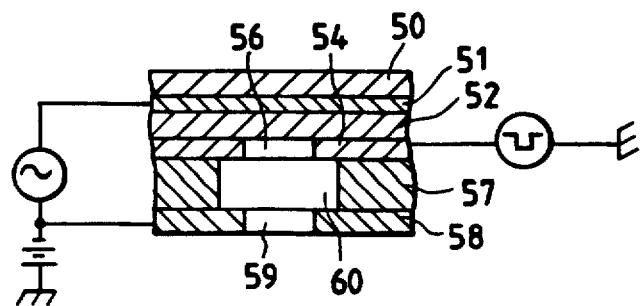
FIG. 6 is a sectional view of the conventional device shown in FIG. 5.

An insulating layer 4 comprising a green sheet, formed of a ceramic such as alumina is stacked on the driving electrodes 3a, 3b, 3c ... The insulating layer 4 is between 10 and 50 μm thick, and preferably 20–30 μm thick. The insulating layer 4, as shown in FIG. 4, has a width equal to the width of the insulating substrate 2 and a length smaller than the length of the insulating substrate 2. Both end portions 4a, 4b of the insulating layer 4 in the longitudinal direction project to cover the entire surfaces of the driving electrodes 3a, 3b, 3c ..., with the terminal portions 3a', 3b', 3c'... of the driving electrodes 3a, 3b, 3c uncovered.

Control electrodes 5a, 5b, 5c intersect the driving electrodes 3a, 3b, 3c ... at a designated angle and form a matrix on the insulating layer 4. The intersections of the driving electrodes 3a, 3b, 3c and the control electrodes 5a, 5b, 5c ..., form discharge generation positions which have a designated density, preferably 240 dots per inch along the longitudinal direction of the recording head 1.

The control electrodes 5a, 5b, 5c ... are formed by pattern-printing metal such as tungsten by screen printing. The control electrodes 5a, 5b, 5c ... are between 5 and 40 μm thick, and preferably 10–20 μm thick. The thickness of the control electrodes 5a, 5b, 5c is similar to the thickness of the driving electrodes 3a, 3b, 3c ...

The control electrodes 5a, 5b, 5c ... are formed by arranging two thin electrodes 6 parallel to each other, and forming a space region 7 for generating ions between the electrodes 6. The space region 7 is preferably a single elongated aperture running substantially the length of the control electrodes 5a, 5b, 5c as shown in FIG. 4. However, apertures with other sizes and shapes may be used as the space region 7.

The respective end portions of the electrodes 6 are connected to each other to form a U-shaped connection 8 substantially like a plane tuning fork. The U-shaped connections 8 are positioned alternately in the cross direction on opposite sides of the insulating substrate 2. Terminal portions 5a', 5b', 5c'... are provided on the end portions of the driving electrodes 5a, 5b, 5c...

An insulating layer 9, formed of a green sheet made of a ceramic such as alumina, is stacked on the control electrodes 5a, 5b, 5c ... The insulating layer 9 is formed by screen printing and has a width and length shorter than the width and length of the insulating substrate 2. The insulating layer 9 has elongated elliptical openings 10 above the space regions 7. The insulating layers 9 are between 10 and 50 μm thick, and preferably 20-30 μm thick.

Figure 2:
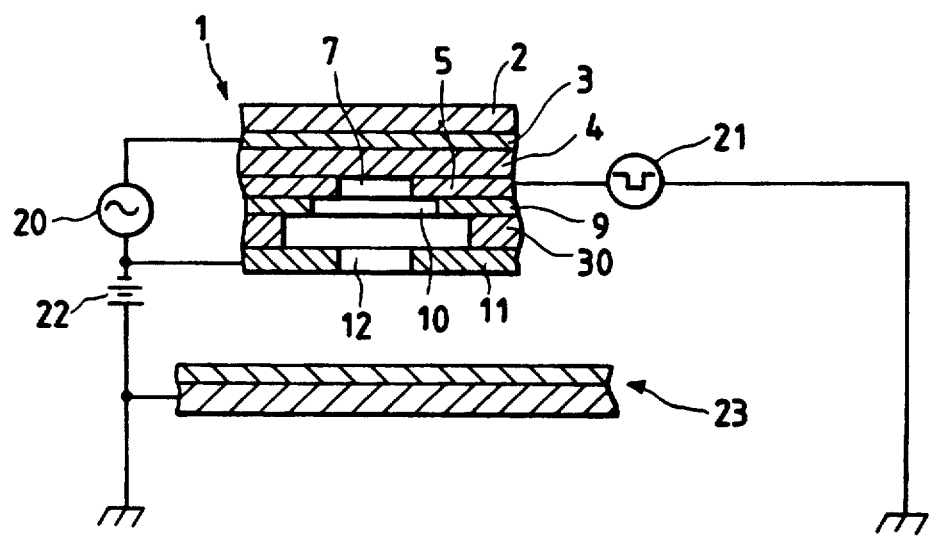
FIG. 2 is a sectional view showing the device illustrated in FIG. 1.
Figure 3:
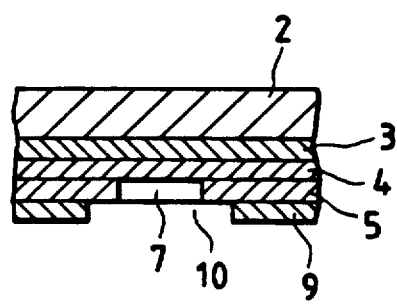
FIG. 3 is a sectional view showing the electrostatic latent image forming device with a screen electrode removed.

Referring to FIGS. 1 and 2, a screen electrode 11 forms a third electrode. The screen electrode 11 is disposed on the surface of the insulting layers 9 through a spacer member 30. The screen electrode 11 is provided with circular openings 12 for extracting ions disposed only at positions corresponding to the intersecting positions of the driving electrodes 3a, 3b, 3c ... and the control electrodes 5a, 5b, 5c ...

The recording head 1 is manufactured as follows. A green sheet 40 mm wide, 200 mm long and 1 mm thick made of alumina having 96% purity forms the insulating substrate 2. The green sheet is obtained by combining alumina ($Al_2O_3$) powder, a firing assistant ($SiO_2$, MgO, CaO or the like), an organic binder, a plasticizer, and a dispersant or the like required for molding. The green sheet is molded to a designated sheet. The molding process may be a press method of press-molding the green sheet material, a roll method by passing the green sheet material between a pair of rolls, or a blade method by use of a blade.

Conductor paste, preferably made of tungsten, is printed in a designated form on the green sheet forming the driving electrodes 3a, 3b, 3c ... The driving electrodes 3a, 3b, 3c ... are preferably 200 μm wide and 20 μm thick.

Alumina paste, an insulator having the same equality as the green sheet and a controlled viscosity, is printed on the green sheet where the driving electrodes 3a, 3b, and 3c... are formed by screen printing. The insulating layer 4 is, thus, laminated preferably 30 μm thick.

A conductor paste is printed by screen printing, on the alumina paste forming the insulating layer 4. Thereby, the control electrodes 5a, 5b, 5c are formed. The space between the two thin electrodes 6 and 6, that is the space regions 7, is 200 μm. The control electrodes 5a, 5b, 5c ... are 20 μm thick and are set so that the adjacent interval is about 0.5 mm after firing.

Alumina paste is printed on the green sheet with the control electrodes 5a, 5b, 5c thereby laminating an insulating layer 9, preferably 20 μm thick.

Then, the laminated multilayer green sheets are attached to each other by pressing, and fired in a reduction furnace at 1500°-1600° C. The insulating substrate 2, the driving electrodes 3a, 3b, 3c ..., the insulating layer 4, the control electrodes 5a, 5b, 5c ..., and the insulating layer 9 are integrally formed in a designated form. The green sheet forming the insulating substrate 2 contracts about 20% during firing to attain the desired dimensions.

To prevent oxidation of the driving electrodes 3a, 3b, 3c ... and the control electrodes 5a, 5b, 5c ... which are made of tungsten, nickel plating is applied to exposed portions of the driving electrodes 3a, 3b, 3c ... and the control electrodes 5a, 5b, 5c....

The screen electrode 11 is super imposed on the insulating layer 9 of the burned alumina ceramic multilayer plate to manufacture a recording head 1. The screen electrode 11 is formed by boring a plurality of 150 μm diameter openings 12 in a preferably stainless steel plate 30 μm thick by photo etching. The screen electrode 11 is installed on the alumina ceramic multilayer plate through a spacer member to keep the distance from the control electrodes 5a, 5b, 5c ... constant by means such as stacking.

Referring to FIG. 2, the operation of the recording head 1 will be described. A high-frequency high voltage is applied between the driving electrodes 3a, 3b, 3c ... and the screen electrode 11 by an a.c. power supply 20. Ion control voltage is applied to the control electrodes 5a, 5b, 5c ... by a power supply 21, and d.c. voltage is applied to the screen electrode 11 by a d.c. power supply 22. Creeping corona discharge occurs in the space regions 7 between the driving electrodes 3a, 3b, 3c ... and the control electrodes 5a, 5b, 5c ... Ions generated by creeping corona discharge are accelerated or absorbed by an electric field between the control electrodes 5a, 5b, 5c ... and the screen electrode 11 to control emission of ions and form an electrostatic latent image. An electrostatic latent image is formed on a dielectric drum 23. The distance between the screen electrode 11 and the dielectric drum 23 is between 100 and 400 μm, and preferably 200-300 μm.

Because the insulating substrate 2 and the insulating layers 4 and 9 of the recording head 1 are formed of ceramic materials, they have high voltage and discharge resistance, are low-priced and are readily available. The recording head 1 can be mass produced by either a molding process, or a firing process. The high-reliability electrostatic latent image forming device can withstand the image of ions, resist chemical reaction by active material generated by discharge or plasma, and resist heat from a heater. The insulating substrate 2 can be manufactured according to designated form and characteristics to provide uniform discharge.

Because the driving electrodes 3a, 3b, 3c ... and the control electrodes 5a, 5b, 5c ... made of tungsten are formed by printing conductive paste on the ceramic green sheet forming the insulating substrate 2 and the insulating layer 4 by screen printing, tungsten paste electrode 3a, 3b, 3c ..., 5a, 5b, 5c ... , just after being printed on the ceramic green sheet, having sharp edges because the paste binder is absorbed and does not flow. Accordingly, the occurrence of abnormal discharge in the local projections of the electrodes and unevenness of discharge due to differences in shape between the electrodes can be eliminated to form a uniform electrostatic latent image.

The foregoing description of preferred embodiments of the invention has been presented for purposes of illustration and description. It is not intended to be exhaustive or to limit the invention to the precise from disclosed, and obviously many modifications and variations are possible in light of the above teachings or may be acquired form practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is

1. An ion producing device for an electrostatic latent image former, comprising:

a plurality of first electrodes;

a plurality of second electrodes, each of said second electrodes having an aperture;

an electrically insulating layer arranged between said first and second electrodes and in contact with said first and second electrodes, said insulating layer being a ceramic material comprising alumina or zirconia; and a voltage source means for applying a voltage to at least one of said second electrodes, whereby ions are generated in said aperture of said at least one of said second electrodes.

2. An ion producing device for an electrostatic latent image former as claimed in claim 1, wherein said first electrodes are arranged in a first direction and said second electrodes are arranged in a second direction cross to said first direction to form a matrix array of first and second electrode intersecting points.

3. An ion producing device for an electrostatic latent image former as claimed in claim 2, wherein each second electrode has a single aperture.

4. An ion producing device for an electrostatic latent image former as claimed in claim 3, wherein said apertures formed in said second electrodes are elongated in said second direction.

5. An ion producing device for an electrostatic latent image former, comprising:

a plurality of first electrodes;

a plurality of second electrodes, each of said second electrodes having an aperture;

a first electrically insulating layer arranged between said first and second electrodes and in contact with said first and second electrodes;

a third electrode;

a second electrically insulating layer arranged between said second electrodes and said third electrode and in contact with said second electrodes, said second insulating layer being a ceramic material comprising alumina or zirconia; and a voltage source means for applying a voltage to at least one of said second electrodes, whereby ions are generated in said aperture of said at least one of said second electrodes.

6. An ion producing device for an electrostatic latent image former as claimed in claim 5, wherein said first electrodes are arranged in a first direction and said second electrodes are arranged in a second direction cross to said first direction to form a matrix array of first and second electrode intersecting points.

7. An ion producing device for an electrostatic latent image former as claimed in claim 6, wherein each second electrode has a single aperture.

8. An ion producing device for an electrostatic latent image former as claimed in claim 7, wherein said apertures formed in said second electrodes are elongated in said second direction.

9. An ion producing device for an electrostatic latent image former as claimed in claim 8, further comprising:

apertures formed in said third electrode for exposing said intersecting points of said first and second electrodes; and a second voltage means for generating a voltage between said second electrodes and said third electrode whereby said ions generated in said aperture formed in said second electrode are drawn into said apertures formed in said third electrode.

10. An ion producing device for an electrostatic latent image former as claimed in claim 1, wherein the first and second electrodes comprise at least one sintered metallic material.

11. An ion producing device for an electrostatic latent image former as claimed in claim 5, wherein the first and second electrodes comprise at least one sintered metallic material.

12. An ion producing device for an electrostatic latent image former, comprising:

a plurality of first electrodes, each comprising a sintered metallic material;

a plurality of second electrodes, each comprising a sintered metallic material and having an aperture;

an electrically insulating layer arranged between said first and second electrodes and in contact with said first and second electrodes; and a voltage source means for applying a voltage to at least one of said second electrodes, whereby ions are generated in said aperture of said at least one of said second electrodes.

13. An ion producing device for an electrostatic latent image former as claimed in claim 12, wherein the electrically insulating layer comprises a ceramic material.

14. An ion producing device for an electrostatic latent image former as claimed in claim 12, wherein said sintered metallic comprises at least one material selected from the group consisting of tungsten, molybdenum, tungsten manganese, and molybdenum manganese.

* * * * *